United States Patent
Eisenmann et al.

(10) Patent No.: US 6,654,669 B2
(45) Date of Patent: *Nov. 25, 2003

(54) PROCESSOR UNIT FOR A DATA-PROCESSING-AIDED ELECTRONIC CONTROL SYSTEM IN A MOTOR VEHICLE

(75) Inventors: Joachim Eisenmann, Suessen (DE); Stefan Gleissner, Korb (DE); Philipp Lanches, Esslingen (DE); Markus Mrossko, Salach (DE); Hans-Juergen Aminger, Ebersbach (DE); Wolfgang Eibach, Holzgerlingen (DE); Volkmar Goetze, Grafenau (DE); Matthias Gruetzner, Schoenaich (DE); Norbert Hagspiel, Tuebingen (DE); Matthias Koehn, Metzingen (DE); Martin Neumann, Sindelfingen (DE); Reiner Rieke, Althengstett (DE); Dieter Staiger, Weil im Schoenbuch (DE)

(73) Assignees: DaimlerChrysler AG, Stuttgart (DE); International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 83 days.

(21) Appl. No.: 09/192,215

(22) Filed: Nov. 16, 1998

(65) Prior Publication Data

US 2001/0002449 A1 May 31, 2001

(30) Foreign Application Priority Data

Nov. 15, 1997 (DE) .......................................... 197 50 662

(51) Int. Cl.[7] .......................... G01M 17/00; G05D 1/00; G06F 17/00; G06F 7/00; B60Q 1/00

(52) U.S. Cl. ................................ 701/1; 701/29; 701/33; 701/36; 340/438; 340/445

(58) Field of Search ................................ 701/1, 35, 33, 701/29, 36; 340/438, 445

(56) References Cited

U.S. PATENT DOCUMENTS

| | | | | |
|---|---|---|---|---|
| 5,467,272 A | * | 11/1995 | Yoshida et al. | 701/1 |
| 5,574,848 A | | 11/1996 | Thomson | 395/181 |
| 5,832,397 A | * | 11/1998 | Yoshida et al. | 701/29 |
| 5,941,966 A | * | 8/1999 | Gotze et al. | 710/105 |
| 6,009,363 A | * | 12/1999 | Beckert et al. | 701/33 |

FOREIGN PATENT DOCUMENTS

| | | |
|---|---|---|
| DE | 196 16 346 A1 | 12/1996 |
| DE | 196 16 753 A1 | 12/1996 |

* cited by examiner

Primary Examiner—William A. Cuchlinski, Jr.
Assistant Examiner—Brian J. Broadhead
(74) Attorney, Agent, or Firm—Crowell & Moring LLP

(57) ABSTRACT

A processor unit for a data-processing-aided electronic control system in a motor vehicle, in which the processor unit operates in real-time and contains within its functional structure a scalable computing unit and a vehicle interface unit, as well as (preferably) a communication coprocessor as separate structural components.

2 Claims, 6 Drawing Sheets

| | | | | | | | | |
|---|---|---|---|---|---|---|---|---|
| S5 | VEHICLE APPLICATIONS | | | | GATEWAY SYSTEM DIAGNOSIS | | | |
| | BASIC CLIENT/SERVER MECHANISMS | | | | | | | |
| S4 | OPERATING SYSTEM COMMUNICATION, NETWORK MANAGEMENT SUCH AS OSEK | | | | | | | |
| S3 | | | | | Treiber | | | |
| S2 | SCALABLE PROCESSOR ARCHITECTURE; SUCH AS POWER PC | | | | | | | |
| S1 | CAN 1 | CAN 2 | CAN 3 | TIP | K-Line | RS232 | Chip Card | D2B Opt. |
FIG.3
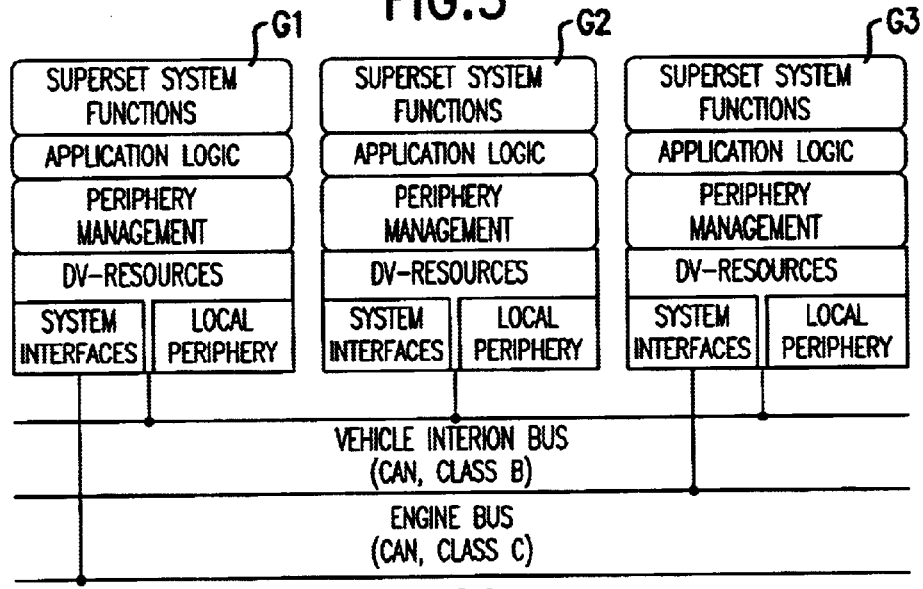
FIG.4
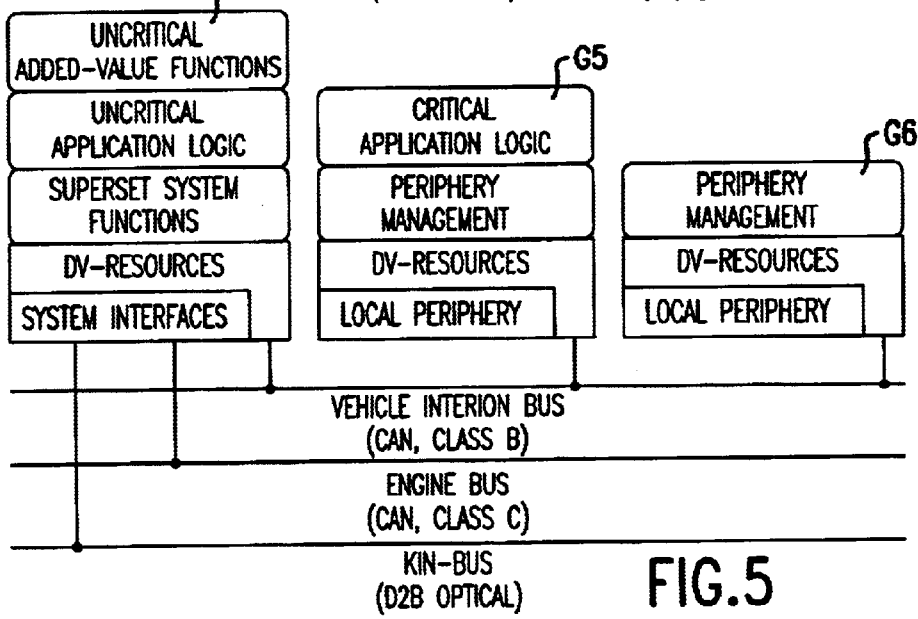
FIG.5

PROCESSOR UNIT FOR A DATA-PROCESSING-AIDED ELECTRONIC CONTROL SYSTEM IN A MOTOR VEHICLE

BACKGROUND AND SUMMARY OF THE INVENTION

This application claims the priority of German application No. 197 50 662.3, filed Nov. 15, 1997, the disclosure of which is expressly incorporated by reference herein.

The invention relates to a processor unit for a data-processing-aided electronic control system in a motor vehicle. Here, the term "control system" is used in its broader sense to also include automatic control functions.

The rising number of electronically implemented motor vehicle control functions and their increasing mutual coupling has led to a clear growth in the complexity, along with corresponding difficulties with respect to the development and mastery, of the entire electronic system of the vehicle. The growing complexity of such control systems is caused, for example, by the increase of system functions of a superset character (for example, on-board network management, system diagnosis, vehicle data storage, and the like). Other causes are an increase in the demand for additional interfaces for superset vehicle functionalities (for example, for chip cards) in connection with newer requirements which are based on the increasing telematics functionality, the desire for personal customizing and band limited programming of the vehicle. This trend simultaneously results in a rapid rise of the demand for computing speed in instances where the processor units are used in the control system, as well as in the required storage capacity.

The increasing desire to provide additional functionalities with respect to mobility, communication, information, safety and entertainment in motor vehicles, such as passenger cars also exists. An additional factor is the increasing tendency toward series vehicles which are developed in parallel and a shortening of the development times of these series, as well as the demand for flexibility in reacting to external market requirements. It is therefore desirable to provide a flexible, standardized and open foundation for the electronic infrastructure of motor vehicles which is capable of taking into account such developments at acceptable costs.

Traditionally, data-processing-aided electronic control systems in motor vehicles were developed such that a separate control unit was assigned to each function to be implemented electronically, for example, one unit for the engine control, one for the antilock system, one for a door locking system and/or an electronic driving block, etc. These individual control units were networked to form a multiple control unit arrangement, for example, via a CAN data bus. In such a conventional multiple control unit arrangement, few or only minor interactions occur between the functions implemented by the individual control units. This conventional system design therefore places physical control units in the foreground, as opposed to placing logic functions in the foreground.

In the case of this typical conventional control unit network structure, superset functions and the application logic exist in almost every control unit. In addition, this conventional networked structure of control units of equal rank or processor units representing control units, often requires that many of such control units have multiple bus connections to different networks which exist in the vehicle. With respect to easily converting messages from one system interface to another, this results in a considerable limitation of the flexibility of the system. This also causes high bus loads, as well as execution time delays.

In German Published Patent Applications DE 196 16 346 A1 and DE 196 16 753 A1, data-processing-aided electronic control systems are disclosed which have a multiple control unit arrangement of several control units which are connected via a data bus network and which can be used in motor vehicles. These systems contain a central control unit in the form of a processor unit with a so-called power PC microcontroller. Because of their RISC architecture, such members of the so-called power PC processor family are particularly suitable for high speed processing of control tasks. In the system disclosed in German Patent Document DE 196 16 346 A1, special measures are utilized to ensure that only a small number of electric connections and only one data bus system are required for a video controller. In the system disclosed in German Patent Document DE 196 16 753 A1, a hierarchical processor architecture with at least two processor levels, which are each optimized for certain control tasks, is specifically provided in a processor unit and used to control the data bus.

It is an object of the present invention to provide a processor unit of the initially mentioned type which can be used as a superset control unit for a data-processing-aided control system operating in real time in a motor vehicle. This processor unit has a design which is as flexible, standardized and open as possible. This is so that changes and/or updates, particularly with respect to the respective appropriate computing speed and varying configuration of the electronic system of the vehicle according to the grade of expansion, series, etc., can be implemented at comparatively low costs.

This and other objects and advantages are achieved by the processor unit according to the invention, in which, within its functional structure, the processor unit contains a scalable computing unit and a vehicle interface unit as separate structural components. The scaling capacity of the computing unit ensures an easy adaptation to different computing speed requirements which, in particular, increase with time. The separation of the scalable computing unit, on the one hand, and the vehicle interface unit, on the other hand, in the layout of the logic design of the processor unit promotes this scaling capacity. This also facilitates the adaptation of the electronic system of the vehicle to different configurations via dislocation of the interface functionalities, which conventionally are not separated from the computing unit in the functional structure. Moreover, this further facilitates the combination of different configurations within the vehicle interface unit, which is functionally separated from the computing unit. Here, the vehicle interface unit is an interface unit which communicates with the computing unit and contains interface functionalities which in a conventional manner, are to be provided in motor vehicles. The processor unit designed in such a manner can be provided in an open and scalable family of different variants with a graded capability. This processor is particularly suitable for use as a superset control unit within a data-processing-aided electronic control system operating in real time within a motor vehicle.

In such a system, normally only limited computing speed resources and a static software configuration are available. Here, the electronic data processing functionality is embedded into the superset system of the electronic system of the vehicle while supporting this system as a so-called embedded system. This embedded system does not appear directly to the user. By using the processor unit according to the invention in a system of this type, data-intensive and computing-intensive parts of the control function, as well as the coordination of decentralized automatic control functions and superset functions are assumable by this processor unit. As a result, other control units can be relieved of such functions and can therefore have a simpler design. The processor unit, which can be used in this manner for performing superset tasks within the vehicle electronic network, can be based for this purpose particularly on a scalable computer architecture. This computer architecture can be in the form of a power PC architecture and can be used in arbitrary vehicle series without the connection of any periphery.

In a further developed embodiment according to the invention, a processor unit contains, as a third separate structural component within its functional structure, a communication coprocessor for implementing data communication operations between the scalable computing unit and the pertaining periphery, for example, physical layers of the design structure of the system. By using this communication coprocessor, the CPU of the computing unit can be relieved from interface-related operations, which is very advantageous particularly when there is a plurality of such system interfaces. The communication coprocessor is implemented in the structure of the logic design as an independent structural component, which is separate from the scalable computing unit and the vehicle interface unit. As a result, the loading of the CPU due to interrupts and computing operations is clearly reduced. Only frames required by the CPU have to be transmitted to it, and only complex operations on frames must be implemented by the CPU. Here, the term "frame" defines the message frame on the respective data transmission system.

In a further developed embodiment according to the invention, the communication coprocessor contains within its functional structure, a bandwidth adapter as a structural component via which incoming messages can be transmitted at a transmission frequency which differs from the receiving frequency. Thus, for example, messages can be transmitted to the CPU at a transmission frequency which is lower than the reception frequency in order to significantly relieve the CPU from transmitted interrupts. As required, messages can also be transmitted to a component which is connected to the bandwidth adapter at a transmission frequency which is higher than the reception frequency. As a result, this component can be provided with messages at its customary message frequency without any additional adaptation measures. Here, a hardware implementation of the bandwidth adapter in the communication coprocessor is advantageous, since this is particularly suitable for an application in the real-time control system of a motor vehicle and permits a further relief of the CPU of the scalable computing unit.

In an embodiment of a processor unit further developed according to the invention, the communication coprocessor contains within its functional structure a Gateway processor implemented in hardware as a structural component. The hardware implementation of the Gateway processor causes a further relief of the CPU of the computing unit with respect to such Gateway functions and is particularly suitable for use in the real-time control system of a motor vehicle.

Other objects, advantages and novel features of the present invention will become apparent from the following detailed description of the invention when considered in conjunction with the accompanying drawings.

BRIEF DESCRIPTION OF THE DRAWINGS

FIG. 3 is a block diagram of the layer model for the processor unit of FIGS. 1 and 2;

FIG. 4 is a block diagram of several mutually networked control units in a conventional control system of a motor vehicle;

FIG. 5 is a representation corresponding to FIG. 4, but for a control system of a motor vehicle which uses the processor unit of FIGS. 1 or 2 as a control unit;

DETAILED DESCRIPTION OF THE DRAWINGS

Figure 1:
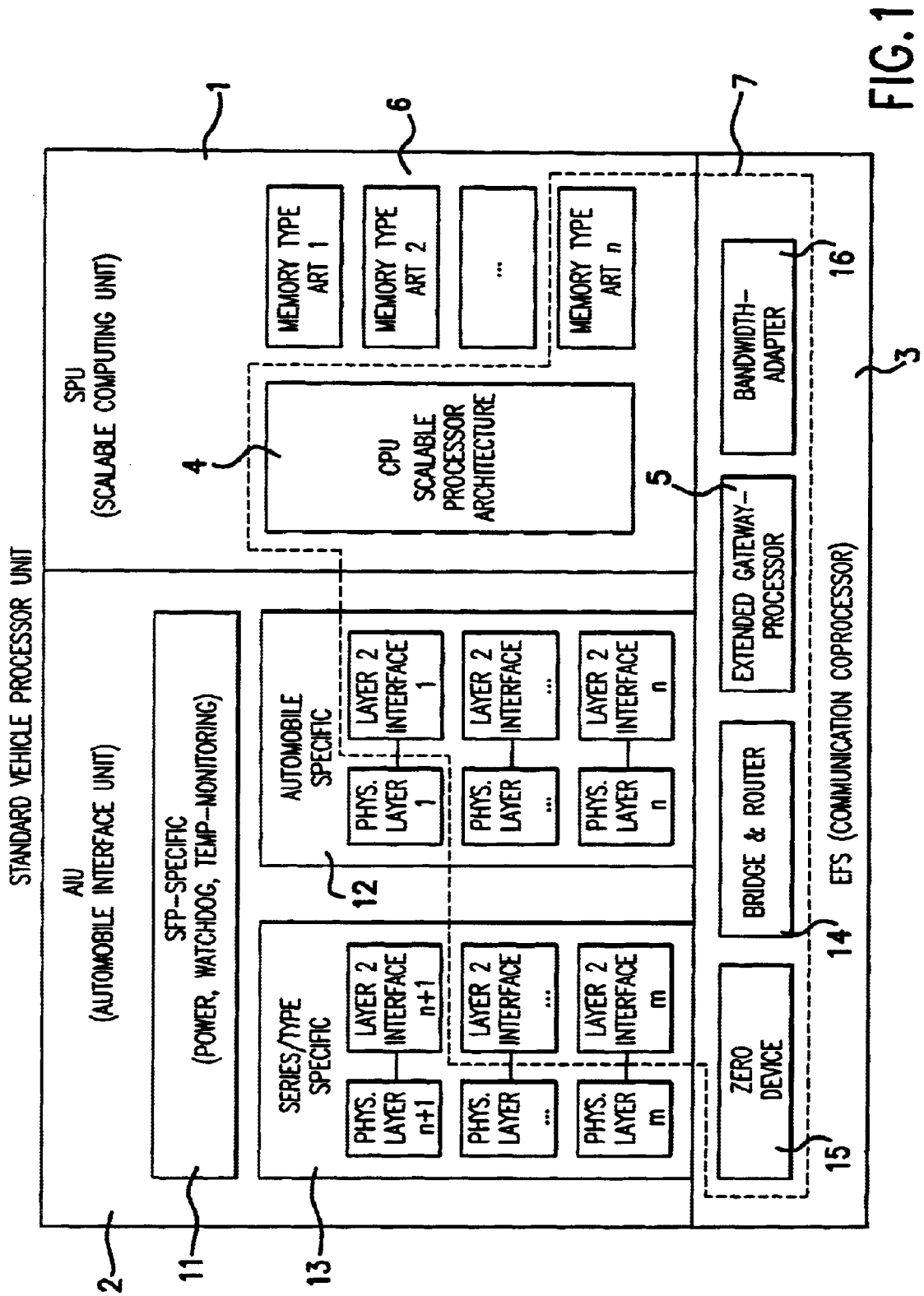
FIG. 1 is a block diagram of the functional structure of a processor unit which can be used in a data-processing-aided electronic control system of a motor vehicle.
Figure 2:
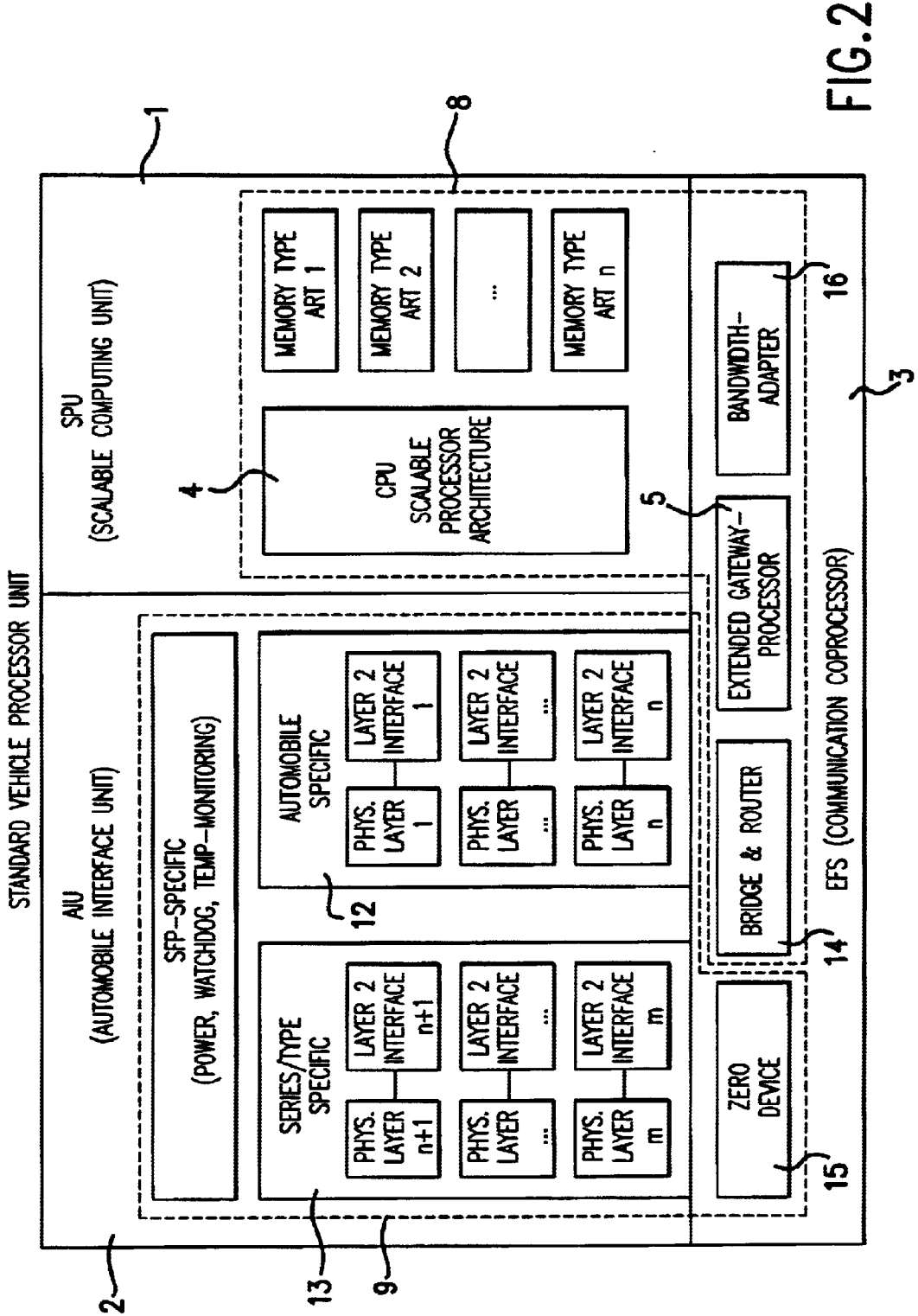
FIG. 2 is a block diagram corresponding to FIG. 1 with a modified chip implementation of the illustrated functions.

FIGS. 1 and 2 illustrate a processor unit according to the invention for a data-processing-aided electronic control system in a motor vehicle (i.e., a standard vehicle processor unit or "SFP") in its functional structure in two different chip implementations. As illustrated above, the architecture of the SFP on this logical level is composed of three separate units. Specifically, the architecture is composed of a scalable computing unit 1 ("SPU"), a vehicle or automobile interface unit 2 ("AIU") and a communication coprocessor or embedded frame streamer 3 ("EFS"). The SFP structured in this manner can be used within a vehicle control system as a superset computer for data-intensive or computing-intensive segments of control functions. The SFP can also be used for the coordination of decentralized automatic control functions and superset functions. It meets the criteria with respect to series independence, scalability and reusability. Because of the concentration of system resources which exist in the SFP, software having critical requirements with respect to memory consumption or capability is most expediently housed in this processor unit which operates as a superset control unit. Regarding the use of software made according to client/server architecture criteria, the SFP is particularly suitable as a central computing node and fulfills the corresponding requirements of the client/server architecture. The SFP is particularly suitable as a superset control unit in a data-processing-aided electronic control system, as described in copending application Ser. No. 09/184,858, filed Nov. 3, 1998, the disclosure of which is expressly incorporated by reference herein.

FIG. 3 illustrates the layer model for the SFP. The bottom layer S1 contains the different existing vehicle-application-related interfaces, as they are known from conventional systems. A layer S2, which contains the scalable processor architecture for the CPU 4 of the scalable computing unit 1 (for example, a power PC architecture), a layer S3 with the required drivers, a layer S4 for operating system, communication and network management functions (for example, a so-called OSEK operating system), a layer S5 with the basic client/server mechanism and the vehicle applications. The layer S5 also contains additional functionalities, for example a Gateway processor 5 contained in the communication coprocessor 3 and system diagnosis functions, etc. These are successively situated above the bottom layer S1.

The SFP, which is based in this manner on a scalable architecture, for example, a power PC architecture, can advantageously be used for superset tasks within a data-processing-aided electronic control system of a vehicle. This is possible without the need to connect any periphery for arbitrary vehicle series. Further, the SFP is advantageously used for fulfilling superset tasks within such a vehicle network. Here, the data-processing-related system segment is implemented as an embedded system in the overall electronic system of the vehicle without appearing directly to the user. The real-time requirement and a static software configuration are typical of this application.

The tasks preferably assumed by the SFP relate to the superset control of other units (for example, the network master), as well as communication tasks. For this purpose, the SFP provides access to all existing vehicle networks. It also implements the securing of access to the networks, the so-called fire wall. As a result, interventions into the vehicle networks, via a corresponding diagnostic and telematic connection from the outside, are no longer possible. In addition, as the superset computer, the SFP performs data-intensive and computing-intensive tasks (if these exist in the form of a coordination function) and are therefore not stationary.

The SFP therefore represents a flexible integration platform for superset tasks for three aspects. Specifically, in a hardware environment, it represents a reusable computer platform which can be scaled with respect to speed and functionality. Second, in a software environment, it represents a client/server architecture which is adapted to the vehicle situations. Last, in a networked environment, it represents a superset network control. Here, in the vehicle interior, the SFP may be present in an instrument panel computer implementation. This implementation of the SFP is capable of meeting the requirements of considerably rising software capacities and a constant growth in communications.

In a comparative manner, FIGS. 4 and 5 illustrate cutouts of typical vehicle network structures via three control units respectively connected to a bus system, with and without the use of the SFP. FIG. 4 shows a conventional system without an SFP. Here, the different control units G1, G2, G3, as illustrated, have an equidistant functional structure. In this conventional structure, multiple bus connections of the control units G1, G2, G3 to the different vehicle networks are frequently required. Here, FIG. 4 shows, as examples, a vehicle interior bus, an engine bus and a communication information (KIN) bus. With a view to easy conversion of frame contents from one system interface to another, this results in a considerable limitation on the flexibility of using the converted frame contents in different buses. It also causes high bus loads, as well as execution time delays. Thus, in the system of FIG. 4, a message which is to be converted from the engine bus to the KIN bus must be transmitted via the vehicle interior bus, because only one of the three control units G1, G2, G3 has access to the two former buses, respectively. Another characteristic of this conventional network structure is the presence of superset functions and of the application logic in almost every control unit. As a result, in comparison to a central management of such tasks, more resources than necessary must be assigned to each control unit G1, G2, G3.

As a comparison, FIG. 5 shows a network structure which was modified with respect to FIG. 4 by the use of the SFP as a G4 of the control units G4, G5, G6. In the SFP, the necessary resources are provided for the processing of all superset tasks concentrated therein and the uncritical application logic, i.e., those functions which only have control characteristics and process no time-critical operations. Functions having special automatic control characteristics are treated as a critical application logic and are processed in distributed systems, i.e., systems with a multiple arrangement of distributed control units. This occurs at the site in the respective control unit. As illustrated, the other control units G5, G6 can therefore be designed in a significantly simplified manner. As the result of the concentration of superset system functions, the uncritical application logic and the system interfaces on the SFP illustrated in FIG. 5, added-value functions can be very advantageously implemented. In conventional distributed systems, these added-value functions could be implemented only with increased costs and additional bus traffic.

In vehicle control systems, the SFP is therefore used for fulfilling superset or distributed applications. These applications, because of their functionally are originally not assigned to a control unit. The SFP is also used for receiving the site-independent functional algorithms. As a result of assigning these functions to the SFP, changes in the algorithms within functions and the mutual interaction of the functions are often representable by modifications within the SFP software. This is possible without having to change the software of the existing conventional control units.

For controlling diverse functions, function blocks are usually required in the form of coordinating functions with a computing-intensive or data-intensive character for a stationary sensor system, a stationary actuator system and site-independent algorithms. In the field of automatic controls, the SFP is used for implementing the coordination of several local automatic controls running in distributed control units.

With respect to superset functions, it is expedient (with respect to the organization of the application software) to accommodate all vehicle data and configuration information in a flash memory of the SFP. As a result, almost the complete band limit programming of a vehicle can be implemented in a single unit. If the SFP is installed early in the production sequence, that is, before the other control units, independent on-board tests and system tests during production can also be performed. For this purpose, the SFP can first be equipped with a pure production software which, at the band limit, will be replaced by the actual vehicle software.

Examples of important superset functions which can be detected by the SFP are on-board network management, telematics, vehicle data memory, bus controls and diagnosis. The latter also has an aspect of distributed functionality which includes (as other important functions) the locking function, the driving light function and the turn signal function. Added-value functions are obtained by the combination of basic functions or other previously combined functions. Here, no new periphery, that is, an actuator system and a sensor system, is required. These added-value functions usually assure the coordination of previously existing functions. Examples of such added-value functions are the turn signal acknowledgment (in the case of the central locking system as a combination of the locking function and the turn signals), as well as the comfort locking function, which combines the locking function and the window lift mechanism/sliding roof operation.

The concentration of the system interfaces on the SFP limits the effects of pertaining modifications to this one control unit. In addition, as a result of the installation of the central Gateway 5, all those superset functions which require an access to several system interfaces are simplified. The communication coprocessor 3 prevents an increase in the load on the CPU 4 because of such a combination of interfaces. The concentration of the data processing resources in the SFP, for economical reasons, is more advantageous than a step-by-step upgrading of each individual control unit. Furthermore, this measure also reduces the repercussions of changed requirements upon the remaining control units.

Since further system interfaces are always connected with additional superset functions, which in turn, require additional data processing resources, the concentration of the system interfaces and of the data processing resources in the SFP is very advantageous. This is particularly true because, as illustrated in FIGS. 1 and 2, the SFP is constructed on the logic level by separately exchangeable but mutually connected modules in the form of the SPU 1, the AIU 2 and the EFS 3. As a result of this, the SFP represents a unit which is scalable in every respect. The SPU represents the module for the data processing resources with the CPU 4 and pertaining memories 6. Here, all system interfaces are situated on the AIU and the EFS 3 relieves the CPU 4 of most communication tasks. Logic interfaces are defined between the individual modules 1, 2, 3. The physical implementation may, for example, provide plug connectors between the logic modules 1, 2, 3 or fitted-together plates. Thus, FIG. 1 illustrates an example in which the components are implemented within the frame 7 (which is illustrated by a broken line, on a chip), while the other components are arranged at a different point of the same plate or on another plate.

FIG. 2 is a respective alternative implementation, in which the components situated within a first frame 8 (which is illustrated by a broken line) are implemented in a first IC, and the components situated within a second frame 9 (which is indicated by a broken line) are implemented on a second IC.

In order to always ensure the compatibility of the hardware with existing software, it is important to always use the same processor architecture. For this purpose, the power PC architecture is particularly useful. The processors and microcontrollers for this purpose are offered by, for example, IBM Corporation. While the basic concept remains the same, this type of a control unit structure permits a flexible and fast reaction to new demands with respect to electronic systems in vehicles. In addition, it is possible to apply previously completed software modules to a new member of the SFP family because binary compatibility and floating point compatibility are ensured within this family. For this reason, scalability of an EFS exists in different expansion stages with respect to CPU-based computing speed, the type and capacity of memory configurations, additional system interfaces, as well as floating point and binary compatibility.

It is an assumption that in the future there will be comparatively little growth with respect to the sensor system and the actuator system. Therefore, it is expedient to consider the triggering of no periphery by the SFP with the exception of the system interfaces. When the vehicle functionality is divided into periphery management on conventional control units and application algorithms on the SFP, frequently recombined and superset functions (which require no additional periphery) are implementable in software which concerns only the SFP. As a result, existing control units are usable for a longer time period. This simplifies the development process and saves development costs.

The implementation of these solutions in the SFP makes it independent of the respective series. Furthermore, because of its scalability, it also makes the SFP adaptable to the respective situations. With respect to the three modules of the SFP, a supply of variants with a different computing speed and/or different memory capacities is provided for the SPU. This may be optionally combined with the AIU and the EFS. The AIU variants take into account different, currently defined interfaces. Interfaces existing in each series are fixed components of the AIU, where the other interfaces are upgrading options or a component of other AIU variants. For a respective series, that SPU with the scarcest resources will now be selected. This provision is still functionally sufficient. In addition, an AIU is selected which contains only the required interfaces. The reusability for different series also provides the advantage that larger quantities can be manufactured.

In the following, the individual modules of the SFP will be explained in detail. As one of the three modules of the SFP, the SPU essentially contains the parts which are determined neither by a vehicle series, nor by a model within a vehicle's series. As illustrated in FIGS. 1 and 2, these include particularly the CPU 4 (which is scalable with respect to its capacity) and the different memories 6 which may vary with respect to their storage capacity and type, for example, RAM, flash, EEPROM, and the like. For representing a whole SFP family, the CPUs 4 for the SPU 1 originate from a common processor family which provides the binary compatibility that is required for reusability of the software.

As the second logic unit from the design of the SFP, the AIU 2 is, in turn, divided into three logically functional sections. Specifically, these are a section 11 with SFP-specific modules, a section 12 with automobile-specific interfaces and a section 13 with series/model-specific interfaces. SFP-specific modules are those modules which are generally important to a control unit, for example a single or multiple voltage supply with voltage monitoring, a watchdog, a plug connector, etc. These parts are not series/model-specific and must be designed only with respect to the respective requirements of the SFP. The automobile-specific interfaces are the interfaces which (according to standards) occur in all series, for example, the I-CAN (interior-Controller Area Network), the M-CAN (motor Controller Area Network); or a serial interface. These parts are also not series/model-specific and are provided on the AIU (also according to industry standards). The series/model-specific interfaces provided as an upgrading option are those which, in addition to the basic scope, are used according to how a vehicle is outfitted. These include connections for a KIN bus, additional CAN interfaces for the diagnosis connection and telematics connection and optionally additional serial interfaces.

Figure 6:
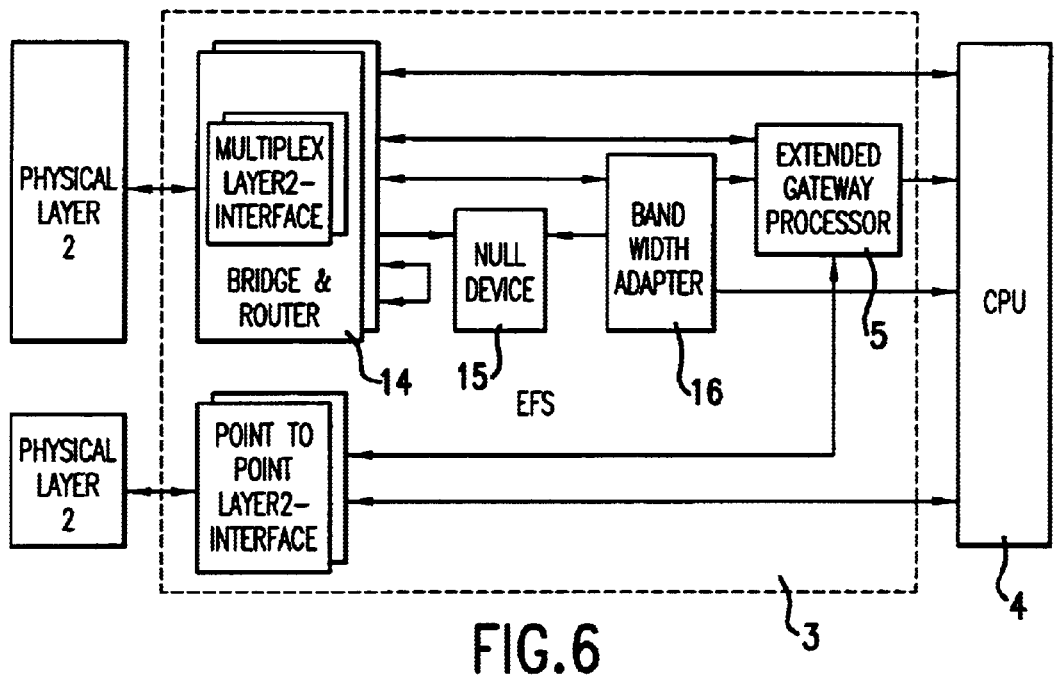
FIG. 6 is a block diagram of the functional structure of a communication coprocessor containing the processor unit of FIGS. 1 and 2.

An EFS 3, which is also provided, permits the establishment of connections between all system interfaces without any excessive load on the CPU 4. FIG. 6 shows the architecture of the EFS 3. In a bridge & router unit 14, the conversion of individual frames occurs from one layer 2 interface directly to another layer 2 interface of the same type. The processing does not require CPU resources, and frames are not changed (in this instance). In the present model, several bridges 14 can be implemented via different layer 2 interfaces and different protocols. However, it is also possible to not implement a bridge function for a certain type of layer 2 interfaces if this interface is singular. In the present cyclical and event-controlled system, the bridge & router unit 14 contributes significantly to the relief of the CPU.

In the model, all filtered-out frames are filed in a virtual zero device 15. In a virtual manner, these frames were rejected or not processed. Moreover, the processing does not require CPU resources and frames are not changed.

Figure 7:
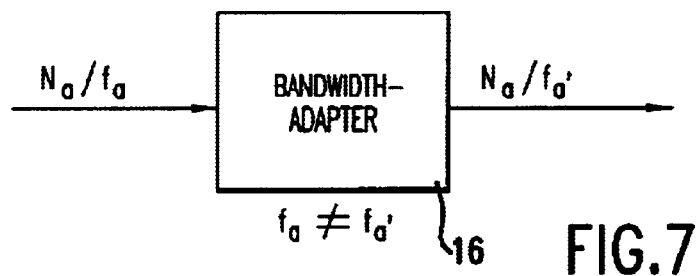
FIG. 7 is a representation of a block diagram of a bandwidth adapter contained in the communication coprocessor of FIG. 6, for explaining its function.

Furthermore, the EFS contains a bandwidth adapter 16. In the bandwidth adapter 16, frames are evaluated according to time-related or quantitative aspects. This is illustrated in detail in FIG. 7. The bandwidth adapter 16 can receive messages $N_a$ at a frequency $f_a$ and transmit these messages $N_a$ at a frequency $f_{a'}$, which differs therefrom. Thus, for example, messages can be transmitted to the CPU 4 at a transmitting frequency $f_{a'}$, which is lower than the receiving frequency $f_a$ which correspondingly extensively relieves the CPU 4 of interrupts. This particularly true in cyclical systems. For such extensive relieving of the CPU 4, the bandwidth adapter 16 is implemented in hardware in the EFS. In this case, frames are not changed. As required, the bandwidth adapter 16 can also transmit messages at a transmitting frequency $f_{a'}$, higher than the receiving frequency $f_a$. As a result, this frequency is adapted, for example, to the normal frequency of a rearwardly connected component. Hence, this component will not require a modification to another frequency.

Figure 8:
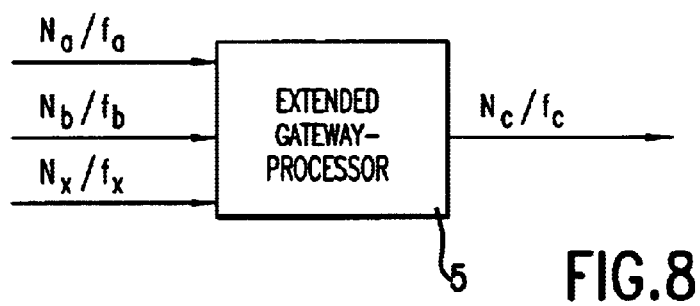
FIG. 8 is a block diagram of a Gateway processor contained in the communication coprocessor of FIG. 6, for illustrating its function.

The Gateway processor 5 of the EFS of the extended type can change frames, compose new frames of one or several of the received frames or also transmit only parts of frames. This is illustrated in detail in FIG. 8. There, the Gateway processor 5 receives different messages $N_a$, $N_b$, $N_x$ at respective pertaining frequencies $f_a$, $f_b$, $f_x$ and generates a message $n_c$ therefrom at the frequency $f_c$. This message may differ from the incoming messages $N_a$, $N_b$, $N_x$ or the pertaining receiving frequencies $f_a$, $f_b$, $f_x$. The processing requires no CPU resources. Here, it is also preferred to implement the Gateway processor 5, as illustrated, in hardware in the EFS. Since the configuration of the Gateway processor 5 takes place statically, a limitation takes place with respect to the implementation of more complex frame operations or frame operations. This, however, depends on different circumstances. In cyclical and event-controlled systems, the Gateway processor 5 contributes extensively to the relieving of the CPU 4. As an alternative, the Gateway processor can be implemented in software and therefore pertain to the CPU 4.

Figure 9:
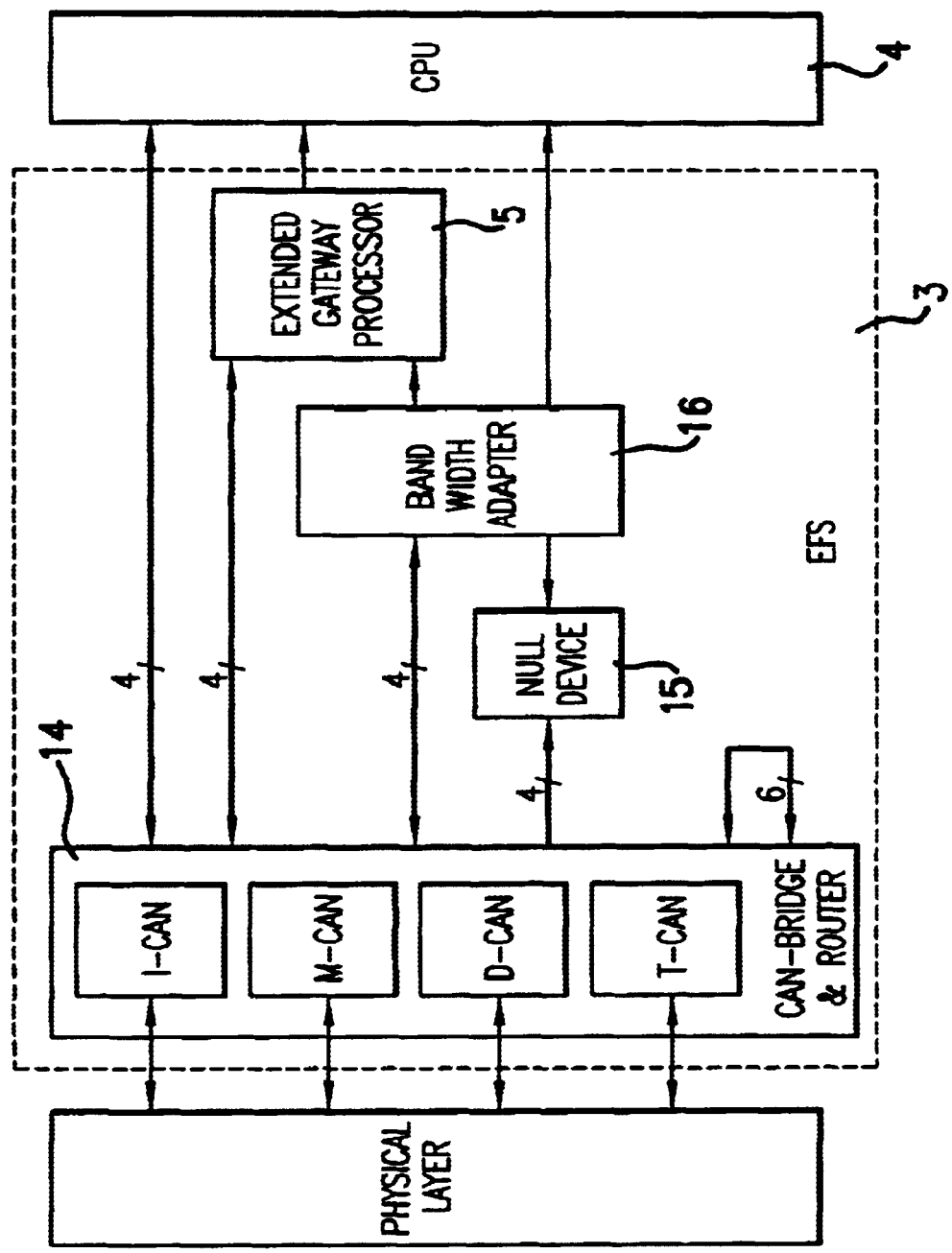
FIG. 9 is a block diagram of the functional structure of a basic implementation of a communication coprocessor contained in the processor unit of FIGS. 1 and 2.

A basic implementation of the automobile-specific EFS is illustrated in FIG. 9. Here, all data flow, occurring in this implementation, is taken into account and the numbers indicated on the data flow arrows indicate the number of possible channels. This basic model comprises the units illustrated in FIG. 6, including the respective pertaining channel.

Figure 10:
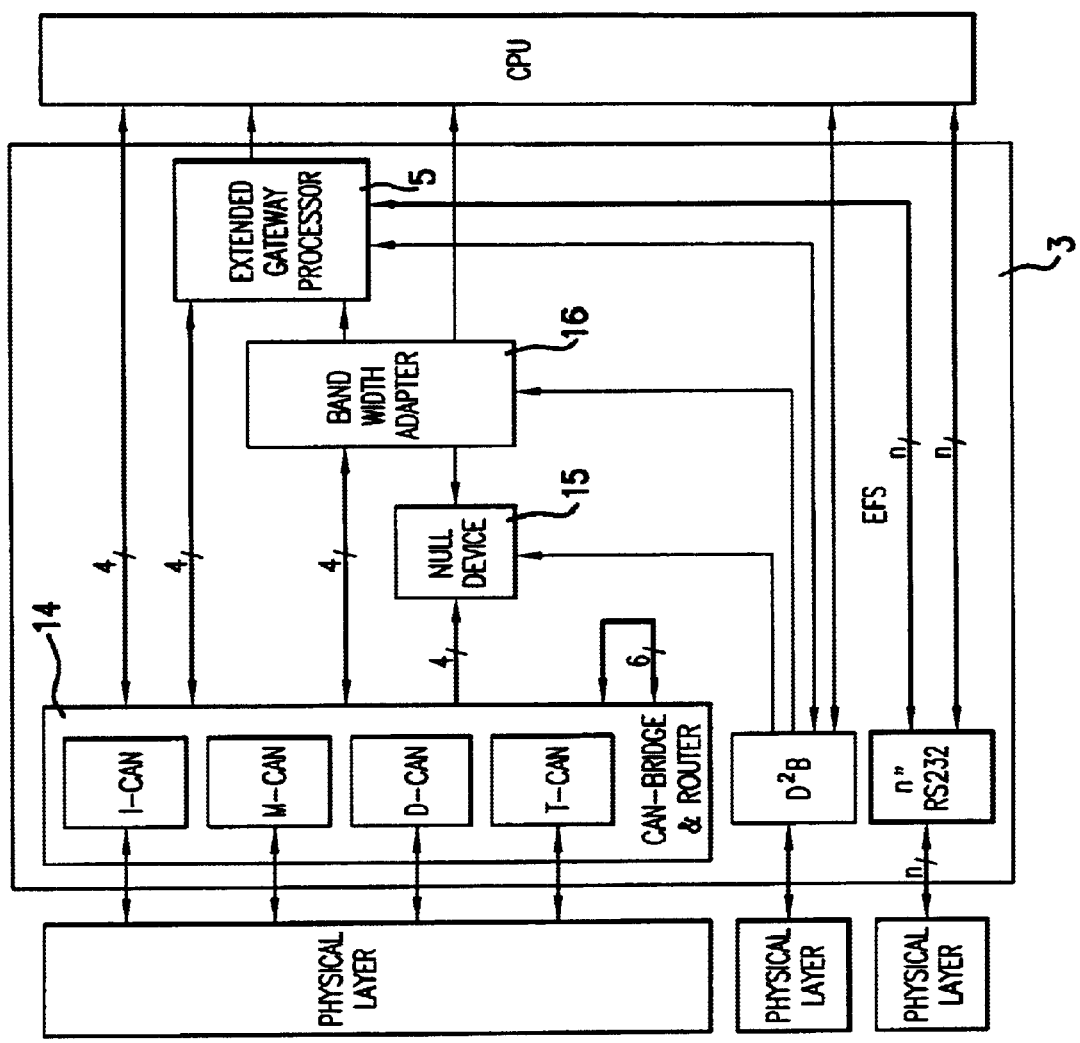
FIG. 10 is a block diagram of the functional structure of an expanded implementation of the communication coprocessor of FIG. 6.

FIG. 10 illustrates an expanded implementation of the EFS. Here, beyond the basic requirements according to FIG. 9, the use of additional system interfaces, for example, the connection of a $D^2B$-optical and a simple serial interface, are taken into account. FIG. 10 indicates the pertaining data flows and the number of their channels. This expanded implementation also comprises all components indicated in FIG. 6. In contrast to the repeatedly occurring CAN interfaces, in the case of the singularly occurring interfaces, such as $D^2B$ optical and the serial interface, a bridge function is not provided. As a result of the point-to-point connection in the case of the serial line, here also, the use of zero devices 15 and the bandwidth adapter 16 can be eliminated.

The above description of an advantageous embodiment shows that the processor unit according to the invention is suitable for generating an open and scalable family of such standard vehicle processor units. In each case, the processor unit which, with respect to its capacity and its functionalities, is best adapted to the respective electronic control system present in the vehicle, can be used as a superset control unit in such a control system. As a result, on the one hand, all demands which are made on the system are optimally met. On the other hand, the remaining control units can be designed in a comparatively simple and essentially conventional manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle network structure with a control unit having a processor unit for a data processing-aided electronic control system; a gateway with a motor vehicle communication interface unit including at least two communication interfaces to interface with at least a first vehicle databus and a second vehicle databus, wherein said first databus has a first transmitting frequency and is directly connected to at least one additional control unit of the vehicle said second databus is one of KIN bus, a CAN bus, a diagnostic bus or a telematic bus and is directly connected to at least another one additional control unit of the vehicle, said second databus having a second transmitting frequency wherein incoming messages (Na) from one of said first and second databuses are transmitted at a frequency (fa') which differs from a receiving frequency (fa) of the other one of said first and second databuses, wherein the vehicle communication interface unit is a separate structural hardware component from said processor unit and wherein the vehicle communication interface unit includes a bandwidth adapter to convert said incoming messages from said one of said first and second databus to another one of said first and second databus; said vehicle communication interface unit further comprising a bridge and a router unit for converting individual ones of received frames from one of said at least two communication interfaces to another one of said at least two communication interfaces; and means for modifying said received frames.

2. The vehicle network structure according to claim 1, wherein a functional structure of the means for modifying said received frame includes a gateway processor as a separate hardware structural component.

* * * * *